T. C. MANNING.
FEED MIXING MACHINE.
APPLICATION FILED APR. 10, 1909.
937,623.
Patented Oct. 19, 1909.
2 SHEETS—SHEET 1.
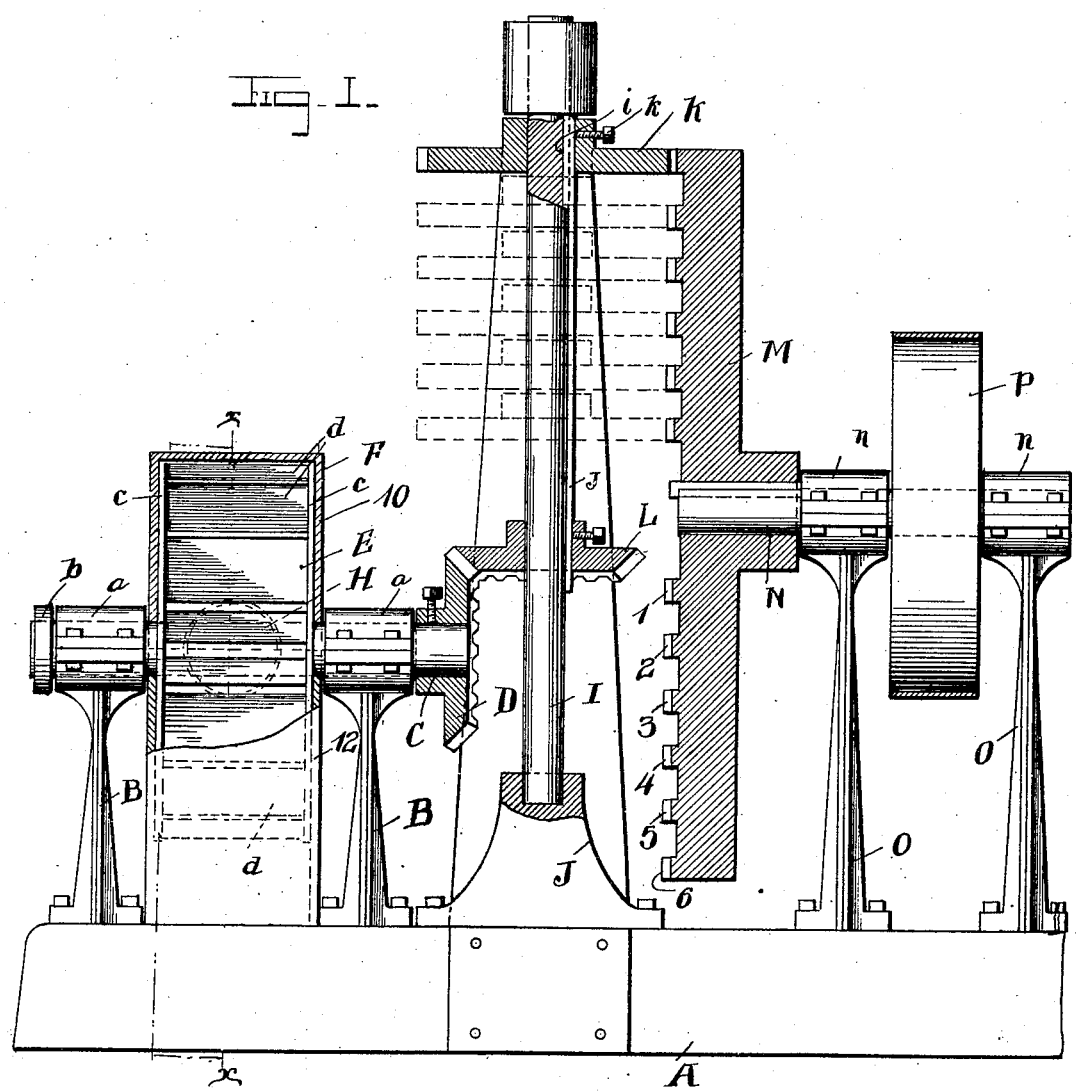

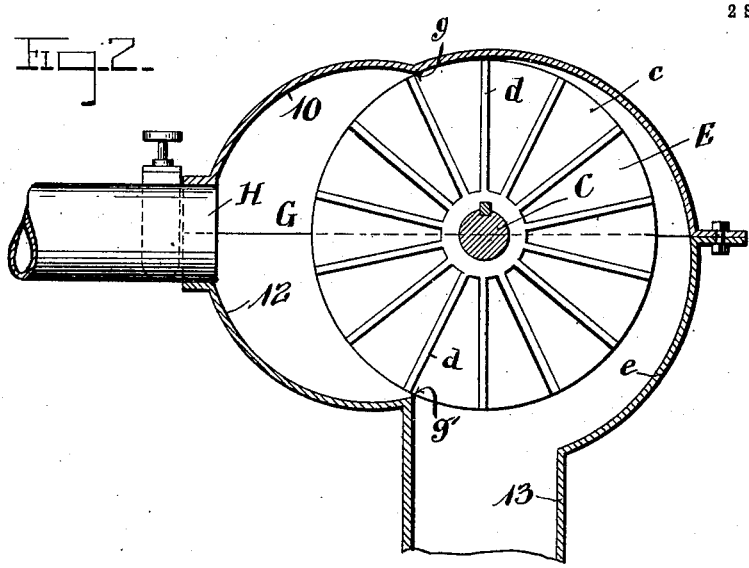
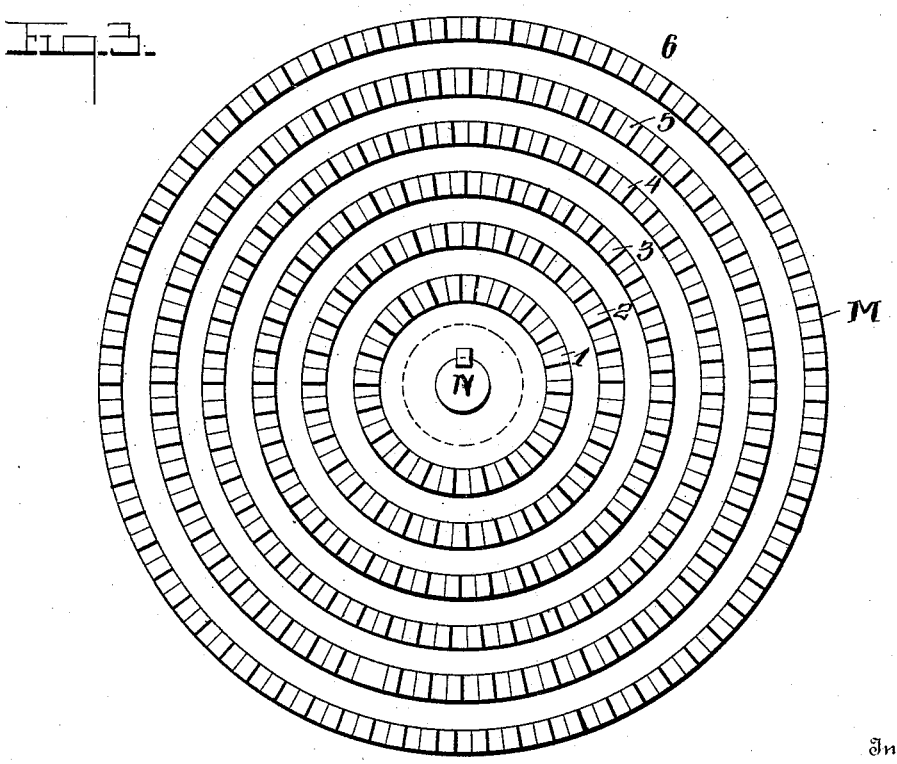

UNITED STATES PATENT OFFICE.

TIMOTHY C. MANNING, OF OMAHA, NEBRASKA, ASSIGNOR TO M. C. PETERS MILL CO., OF OMAHA, NEBRASKA.

FEED-MIXING MACHINE.

937,623.  Specification of Letters Patent.  Patented Oct. 19, 1909.

Application filed April 10, 1909. Serial No. 489,134.

*To all whom it may concern:*

Be it known that I, TIMOTHY C. MANNING, a citizen of the United States, residing at Omaha, in the county of Douglas and State of Nebraska, have invented certain new and useful Improvements in Feed - Mixing Machines, of which the following is a specification.

This invention relates to a certain new and useful machine designed especially for delivering charges of molasses for admixture with a chop food of alfalfa leaves and stems, or other hay or forage, to be used as a food for stock, cattle, fowls, etc.

My invention consists, essentially, of a carrier having buckets or chambers adapted to receive the molasses, or other sugar solution, or grain or other loose material, from a reservoir and deliver the same in substantially uniform charges through a suitable outlet.

My invention also consists of a rotatable wheel or carrier having radial pockets or chambers adapted to operate in conjunction with a receiver or vessel containing molasses or like sugar solution, or other material, in such manner that the pockets or chambers receive charges of the molasses, or other material, and thence conduct the same to a point where the molasses, or other material, will be delivered from the pockets or chambers into a suitable outlet.

My invention consists, further, of means associated with the aforesaid carrier, for imparting a variable speed thereto to thereby increase or decrease the amount or proportion of molasses, or other material, delivered in a given time.

My invention consists of the parts and the constructions arrangements and combinations of parts which I will hereinafter describe and claim.

In the accompanying drawings, forming part of this specification and in which similar reference characters indicate like parts in the several views:—Figure 1 is a side elevation of a feeder embodying the salient features of my invention. Fig. 2 is a vertical sectional view of the same, on the line X—X of Fig. 1. Fig. 3 is a face view of the variable speed gear.

In the manufacture of stock foods composed of alfalfa hay, clover hay, and other like forage, it has been found very beneficial to mix with the same certain proportions of molasses or other sugar solution which not only makes the food more palatable to the animal, but also, because of its contained protein conduces to the formation of animal fat.

The present invention relates, primarily, to a mechanical means for automatically delivering or feeding measured charges of molasses or like sugar solution for admixture with a chopped food of alfalfa leaves and stems, or of clover or other forage, the proportion or amount of molasses to be fed to the chopped food being determined or regulated by the speed at which the molasses feeding or measuring devices are operated, as I will now explain.

Upon an appropriate base or foundation A, I bolt or otherwise secure the spaced vertical standards, B, whose upper ends are formed with bearings $a$, for the journals of a horizontal shaft C, one end of which has fixed to it a collar $b$, while to the opposite end is secured a bevel gear wheel D. Upon said shaft between the aforesaid standards is mounted a suitable bucket carrier E. This carrier is herein shown for illustrative purposes as being of the vertically revoluble wheel-type; it consists of two spaced sides or disks $c$, $c$, pierced at their centers to receive the shaft C, to which the disks are keyed or otherwise fixed.

Between the disks are arranged the radial wings or blades $d$, which form intermediate pockets or chambers each adapted to receive a charge of molasses and to hold the same while the wheel is making a partial revolution, and finally delivering the charge into a spout or outlet leading to the material with which the molasses is to be mixed.

The feed-wheel E, operates in a suitable housing or casing F, and the shaft C, of the wheel is arranged eccentric to the axis of the casing to provide a gradually enlarging space at one side leading to the point where the pockets or buckets begin to deliver the charge of molasses, and which space empties into an outlet tube or passage $e$, through which the molasses will be directed to the point where it is to be mixed with the chopped forage before mentioned.

The casing comprises two opposed segmental portions 10, 12, struck from different centers, between which segmental portions the wheel rotates with its periphery forming substantially a wall of one of said portions; this latter portion 12, of the casing is therefore at one side of the feed wheel and forms a receiver or chamber G, into which the molasses is delivered by means of a valve-controlled pipe H, said chamber being open on its inner side and the feed wheel operating in this open side between the angles or points $g$—$g'$, formed by the junction of the ends of the two segmental portions 10, 12, so that its pockets or chambers are successively brought into register with the chamber and receive charges of the molasses and thence carry the same to the opposite side 10, of the casing, where a gradually widening space is formed between the casing and wheel, as the wheel continues to rotate the molasses runs out of the chambers or pockets of the wheel and into the casing and finally into the outlet 13.

To prevent leakage of the molasses from the chamber G, directly into the outlet, 13, the wheel has a ground or other close joint with the inner wall of said receiver.

In order that the feed of the molasses may be increased or decreased as circumstances require and as some foods require a larger and other a smaller proportion of molasses, I provide a machine with a variable speed mechanism which I will now describe.

A vertical shaft I has its lower end mounted in a step or bearing J, fixed to the foundation or base and in its upper portion is formed a groove $i$, in which is slidably mounted the key $j$ of a horizontal wheel K, which may be rigidly secured to the shaft by means of a set-screw $k$. There is also, fixedly secured to an intermediate part of the vertical shaft I, a bevel gear wheel L, adapted to mesh with the like gear on the horizontal shaft of the molasses feed-wheel, whereby this latter wheel is operated from the vertical shaft.

The before mentioned gear wheel K, is engaged and driven by a vertically revoluble toothed wheel M of large diameter and which is fixedly secured on one end of a horizontal shaft, N, mounted in bearings $n$, on the upper ends of vertical standards, O, bolted to the base or foundation of the machine, said shaft N, having fixed to it a belt pulley P, to which power is applied in any well known manner to operate the shaft and the wheel K, and through the vertical shafts and gear wheels before mentioned, transmit rotary motion to the feed wheel.

In order that the speed of the feed wheel may be increased or diminished as desired, the toothed wheel K is adapted to be shifted vertically on the shaft I, from one point to another as shown by the dotted positions in Fig. 1; and the face of the large vertically revoluble wheel M, is formed with a concentric series of toothed portions each constituting a toothed wheel. The toothed portions are numbered from 1 to 6 in Fig. 3 and they increase in diameter from the center of the shaft outwardly and one of said portions is adapted to operatively engage the teeth of the horizontal wheel K, in whatever position the latter is moved on its shaft I. In other words, if a slow speed is desired for the feed wheel E, the wheel K, will be moved at such point on the shaft I, that one of the smaller toothed surfaces of the speed gear M will engage and drive the same and thereby through the vertical shaft I, and the intermeshing bevel gears D and L, and horizontal shaft C, rotate the feed wheel; if an increased amount of molasses is desired the feed wheel is speeded up by moving the wheel K, to such point on the vertical shaft, I, that one of the circles of teeth nearer the circumference of the speed gear will engage and drive the wheel K. The speed of the feed-wheel is speeded up by moving the is thus determined by the portion of the speed gear with which it is engaged, and the change from one position to another is quickly effected by loosening its set screw and moving said wheel higher or lower on the shaft I, its spline sliding in the groove in said shaft, and then securing the gear wheel in its new position by tightening up the set screw.

While the feeder is herein described as designed primarily for feeding molasses to chopped feed, it will be apparent that it may be used for feeding other material as grains, or other dry particles, or liquid. For instance, it can be successively used for blending liquors and for blending various kinds of grains, therefore I do not limit the invention to any particular field of use.

Having thus described my invention what I claim as new and desire to secure by Letters Patent is:—

1. In a feed mixing machine of the character described, the combination of a casing having a feeding inlet at one part thereof and an outlet at another part, a rotary carrier within said casing and provided with chambers adapted to successively register with the feeding inlet of the casing and to successively deliver the material into the outlet portion of the casing, means for operating said carrier, and means located between the carrier and its operating means for imparting a variable speed to the carrier.

2. In a feed mixing machine of the character described, the combination of a casing having a feeding inlet at one part thereof and an outlet at another part, a rotary carrier within said casing and provided with chambers adapted to successively register with the feeding inlet of the casing and to successively deliver the material into the outlet portion of the casing, means for operating said carrier, and means for imparting a variable speed to the carrier, said lastnamed means including a power shaft having a toothed wheel with a series of independent concentric driving portions of successively increasing diameters, and a power transmitting shaft interposed between the adjacent ends of the power shaft and the rotary carrier, said transmitting shaft having a toothed member adjustably mounted thereon and adapted to engage either of the driving portions of the first-named wheel.

3. In a feed mixing machine of the character described, the combination with a rotary carrier having chambers for the reception of measured charges of material, and a horizontal shaft for the carrier, of means for imparting variable speed to the carrier, said means including a horizontal drive shaft, a toothed wheel fixed thereto having concentric circles of driving surfaces arranged in a common plane and of a successively increasing diameter, a transmission shaft vertically disposed between the inner ends of the drive shaft and the shaft of the carrier, driving connections between said transmission shaft and the carrier, a toothed wheel carried by the transmission shaft and slidably mounted so that it may operatively engage either of the said driving surfaces of the first-named wheel, and means for fixedly securing the second named wheel in its adjusted positions.

4. In a feed mixing machine of the character described, the combination with a rotary carrier having radial partitions forming intermediate feed receptacles, with open ends arranged around the circumference of the carrier, a feed container with which the receptacles successively register, and receive charges of material therefrom, a casing in which the carrier is revoluble having an outlet into which the receptacles successively discharge, and means for operating the carrier, said means comprising parallel horizontal shafts and an intermediate vertical shaft, gearing between one of said horizontal shafts and the vertical shaft, and a variable speed-gear mechanism between the other horizontal shaft and said vertical shaft.

5. In a feed mixing machine of the character described, the combination of a casing having opposed segmental portions struck from different centers, one of said portions adapted as a receiver of material and having a feed inlet, said other segmental portion having an outlet for said material, and a feed wheel revoluble in the casing having peripheral receiving chambers, said wheel having its periphery forming a close joint with the angles formed by the meeting ends of the said segmental portions of the casing, and having its chambers adapted to successively register with the receiver portion of the casing and to receive material therefrom, and means for rotating the wheel to cause its chambers to successively deliver the material into said outlet.

In testimony whereof I affix my signature in presence of two witnesses.

TIMOTHY C. MANNING.

Witnesses:
　W. T. BURNS,
　WILLIAM HAFFKE.